United States Patent [19]

Rollor

[11] Patent Number: 5,489,083
[45] Date of Patent: Feb. 6, 1996

[54] APPARATUS FOR MOVING MECHANICAL OBJECTS AWAY FROM EACH OTHER

[76] Inventor: Edward A. Rollor, 4268 Grand Oaks Dr., Kennesaw, Ga. 30144

[21] Appl. No.: 229,321

[22] Filed: Apr. 18, 1994

[51] Int. Cl.⁶ ........................................ B66F 3/00
[52] U.S. Cl. .......................................... 254/119
[58] Field of Search ............................ 254/113, 119, 254/123, 15–17

[56] References Cited

U.S. PATENT DOCUMENTS

| | | |
|---|---|---|
| 14,676 | 4/1856 | Oliver . |
| 67,297 | 7/1867 | Hammond . |
| 300,968 | 6/1884 | Hatfield ........................ 254/15 |
| 306,424 | 10/1884 | Pickard . |
| 634,561 | 10/1899 | Manwaring ................... 254/15 |
| 673,164 | 4/1901 | Fike ............................ 254/15 |
| 797,245 | 8/1905 | Wallum . |
| 1,018,070 | 2/1912 | Morehead . |
| 1,470,515 | 10/1923 | Watts . |
| 1,512,356 | 10/1924 | Miller . |
| 1,813,426 | 7/1931 | Russell et al. ............... 254/113 |
| 2,222,744 | 11/1940 | Gallien, Jr. . |
| 2,647,722 | 8/1953 | Koester ...................... 254/113 |
| 3,331,584 | 7/1967 | Schwartz . |
| 3,524,623 | 8/1970 | Campbell . |
| 3,591,143 | 7/1971 | Boller ........................ 254/119 |
| 3,727,490 | 4/1973 | Diffenderfer et al. . |
| 3,779,515 | 12/1973 | Larios et al. . |
| 3,864,769 | 2/1975 | Hamilton . |
| 5,165,312 | 11/1992 | Boudjack . |

OTHER PUBLICATIONS

One–Hand Clamp–Phil McCafferty–Aug. 1989–p. 79.

*Primary Examiner*—Robert C. Watson
*Attorney, Agent, or Firm*—Louis T. Isaf; James A. Witherspoon

[57] ABSTRACT

Provided is a multi-functional tool that includes two elongated bars. When the tool is in a push configuration, the bars are pivotally connected by a collar mechanism to define an obtuse angle between the bars, with each bar having a foot end extending from the obtuse angle. A force properly applied to the pivot point, for example, increases the magnitude of the obtuse angle thereby forcing the foot ends away from each other, whereby mechanical objects engaged by the foot ends are moved away from each other. When the tool is in a pull configuration, the two elongated bars are connected by the collar mechanism such that they are generally parallel and such that the foot ends thereof extend from the collar in the same general direction, with one foot end extending further from the collar than the other foot end. Each foot end is engaged to a mechanical object and the foot extending further from the collar is pivoted relative to the mechanical object it is engaging such that the bar from which the other foot end extends is tensioned, whereby the mechanical objects engaged by the foot ends are moved away from each other. Not only does the collar mechanism facilitate pivotal connection between the two elongated bars, but it also selectively facilitates translational adjustment between the two elongated bars.

13 Claims, 4 Drawing Sheets

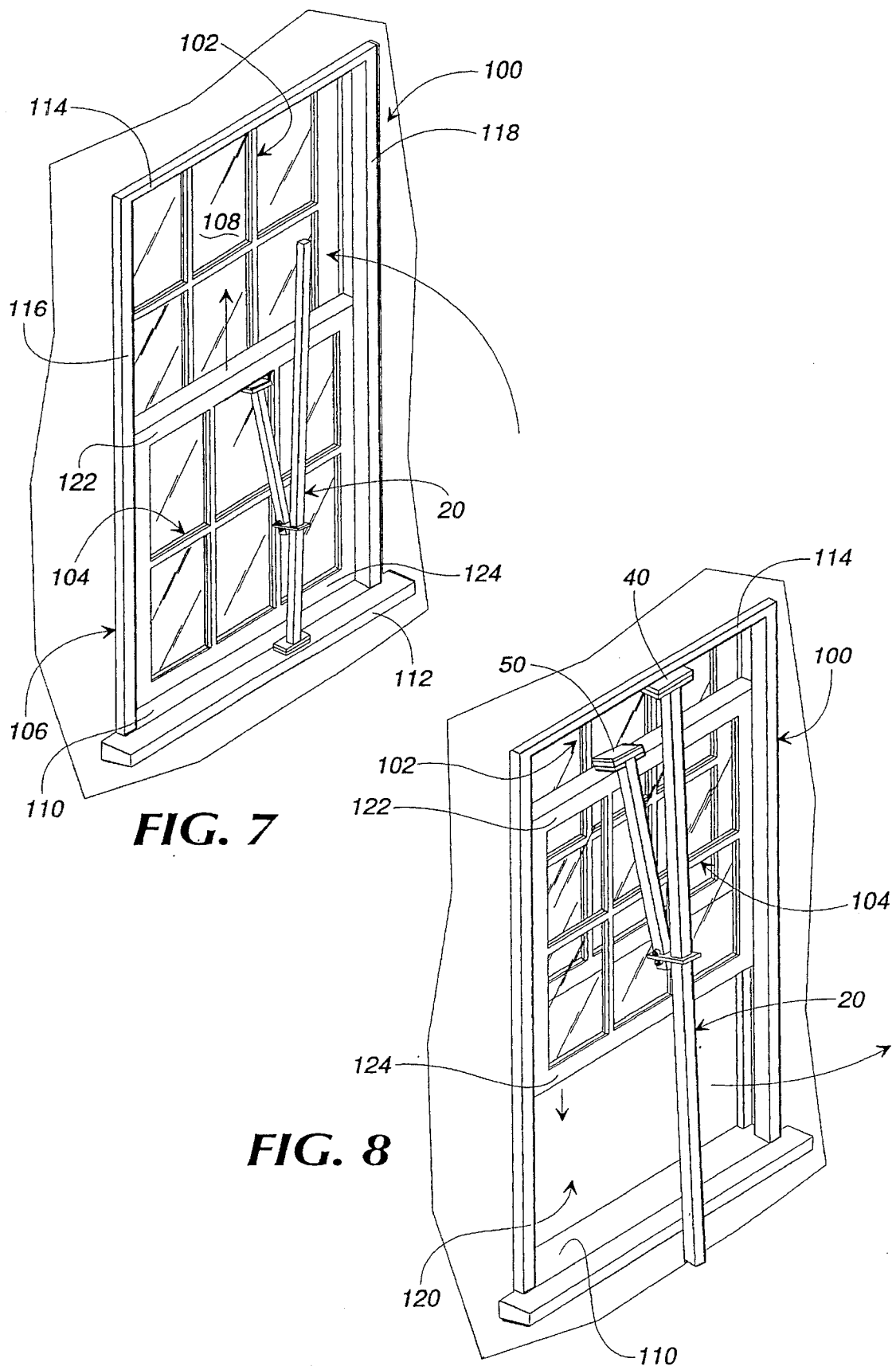

APPARATUS FOR MOVING MECHANICAL OBJECTS AWAY FROM EACH OTHER

BACKGROUND OF THE INVENTION

The present invention relates generally to the field of moving two mechanical objects away from each other, and more particularly to the field of tools that are interposed between two mechanical objects, provide a mechanical advantage, and function to move the two mechanical objects away from each other.

Many different types of tools provide a mechanical advantage and function to move objects away from each other. Crowbars and jacks are examples of such tools. There are many different types of conventional crowbars and conventional mechanical and hydraulic jacks. While most crowbars and jacks, like many of the other tools that function to move objects apart, are very effective in certain applications, they are often cumbersome and ineffective in certain other applications. For example, and not limitation, many conventional jacks and crowbars cannot be readily employed to open or close, through a full range of motion, certain types of windows, or aid in the opening of dresser drawers and the like.

For example, and not limitation, double hung windows are one type of window that is infamous for becoming stuck and difficult to open and close. Most double hung windows include an upper window panel and a lower window panel that are housed within a peripheral frame. Each window panel includes a single or plurality of panes of glass to allow light to pass therethrough. The frame typically includes a laterally extending lower crossmember, with a window sill extending therefrom, and a laterally extending upper crossmember parallel to and displaced above the lower crossmember. The frame typically further includes a pair of vertical upright-members that are distal from one another. Both of the upright-members extend between the crossmembers, whereby the crossmembers and upright members cooperate to define a window opening. The upright-members define elongated vertical channels that are oriented toward the window opening, and the vertical edges of the window panels reside and travel in the channels to facilitate the opening and closing of the window. Often the upper window panel or lower window panel becomes stuck making it difficult or impossible to open and close the window. Often the window panels become stuck as a result specific circumstances such as being in the closed position for a long period of time, or after portions of the window have been painted. Some window panels stick absent any special circumstances and are simply always a nuisance to open and close.

There is, therefore, a need in the industry for a method and apparatus for solving these and other related, and unrelated, problems.

SUMMARY OF THE INVENTION

Briefly described, the present invention includes a pair of connected bars that cooperate to provide a mechanical advantage. More particularly, the preferred embodiment of the present invention includes a multi-functional tool that includes two elongated bars that are capable of being configured in two different configurations, and each configuration has a method of operation associated therewith. In accordance with the preferred embodiment of the present invention, one of the elongated bars is a lever bar that is at least partially encircled by a collar. The collar is capable of freely sliding along the lever bar when the collar is in an uncocked configuration. The collar is immobilized with respect to the lever bar when the collar is in a cocked configuration. The other of the elongated bars is a pivot bar that is pivotally attached to the collar. The collar facilitates adjustments that allow the present invention to adapt to a wide range of applications.

In accordance with the first configuration of the present invention, which is referred to as the push configuration, an obtuse angle is defined between the bars, and each bar has a foot end extending from the obtuse angle. In accordance with the first method of operation, which is referred to as the push method of operation, a force is applied to the lever bar to increase the magnitude of the obtuse angle, whereby the foot ends are forced away from each other, whereby mechanical objects engaged by the foot ends are moved away from each other.

In accordance with the second configuration of the present invention, which is referred to as the pull configuration, the lever bar and pivot bar are maintained generally parallel such that the foot ends thereof extend from the collar in the same general direction. In accordance with the second configuration, the foot end of the lever bar preferably extends further from the collar than the foot end of the pivot bar. In accordance with the second method of operation, which is referred to as the pull method of operation, each foot end is engaged to a mechanical object. Then, a force is applied to the lever bar to cause the lever bar to remain engaged to and pivot relative to the mechanical object it is engaging. The force is applied such that the pivot bar is tensioned and the mechanical object engaged by the pivot bar is moved away from the mechanical object engaged by the lever bar.

It is therefore an object of the present invention to provide a multi-functional tool.

Another object of the present invention is to provide a method of using the multi-functional tool.

Yet another object of the present invention is to provide a tool that provides a mechanical advantage.

Still another object of the present invention is to provide a tool that is readily adjustable.

Still another object of the present invention is to aid in the movement of mechanical objects.

Still another object of the present invention is to aid in the movement of mechanical objects through a wide range of motion.

Still another object of the present invention is to aid in the opening and closing of windows or the like.

Other objects, features and advantages of the present invention will become apparent upon reading and understanding this specification, taken in conjunction with the accompanying drawings.

BRIEF DESCRIPTION OF THE DRAWINGS

FIG. 7 is a perspective view of the multi-functional tool in the first configuration and engaging a double hung window, in accordance with the preferred embodiment of the present invention.

FIG. 8 is a perspective view of the multi-functional tool in a second configuration and engaging a double hung window, in accordance with the preferred embodiment of the present invention.

DETAILED DESCRIPTION OF THE PREFERRED EMBODIMENT

Figure 1:
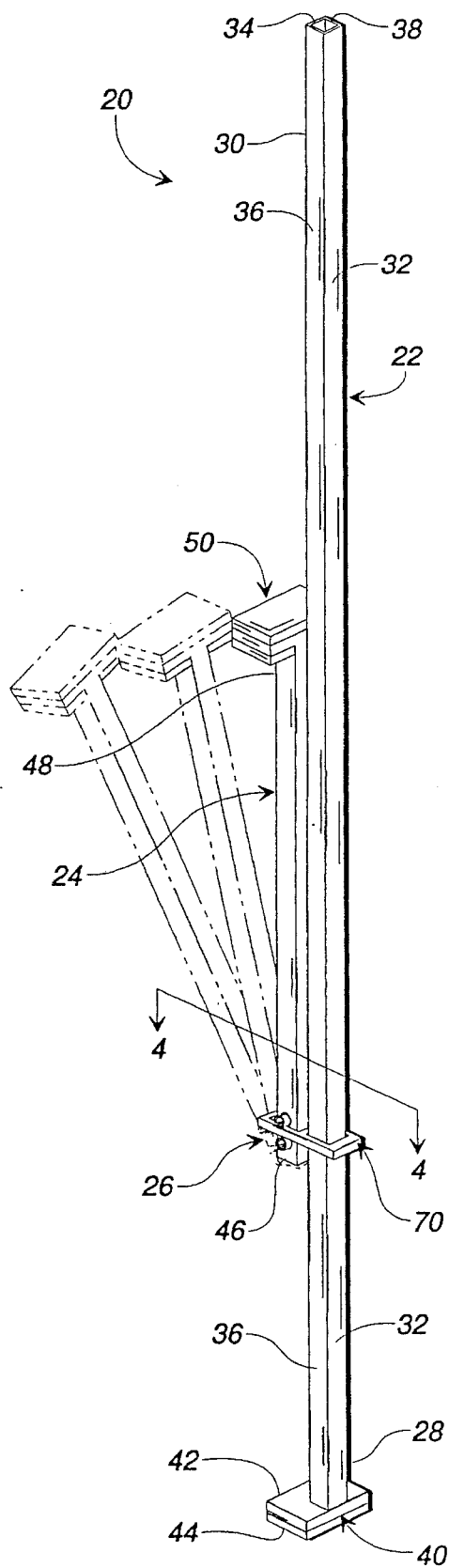
FIG. 1 is a front perspective view of a multi-functional tool in a first configuration, in accordance with the preferred embodiment of the present invention.

Referring now in greater detail to the drawings, in which like numerals represent like components throughout the several views, FIG. 1 is a front perspective view of a multi-functional tool 20 in accordance with the preferred embodiment of the present invention. The multi-functional tool 20 includes an elongated lever bar 22, an elongated pivot bar 24, and an attachment assembly 26 movably connecting the pivot bar 24 to the lever bar 22. The lever bar 22 includes a base end 28 and an opposite handle end 30. The lever bar 22 further includes a front surface 32 and an opposite rear surface 34, and opposite side surfaces 36,38, each of which extends between the ends 28,30. A base foot 40 is at the base end 28 and includes a base plate 42 that is connected and perpendicular to the base end 28. The base plate 42 has a front edge that is generally even with the from surface 32, a rear edge that extends beyond the rear surface 34, a side edge that extends beyond the side surface 36, and a side edge that extends beyond the side surface 38. The bottom side of the base plate 40 is covered with a pad 44. The pivot bar 24 includes an attached end 46 and an opposite free end 48. A pivot foot 50 is attached to the free end 48. The broken-line showing of two pivot bars 24 in FIG. 1 is meant to provide a general indication of the pivotal range of motion of the pivot bar 24, as will be discussed in greater detail below.

Figure 2:
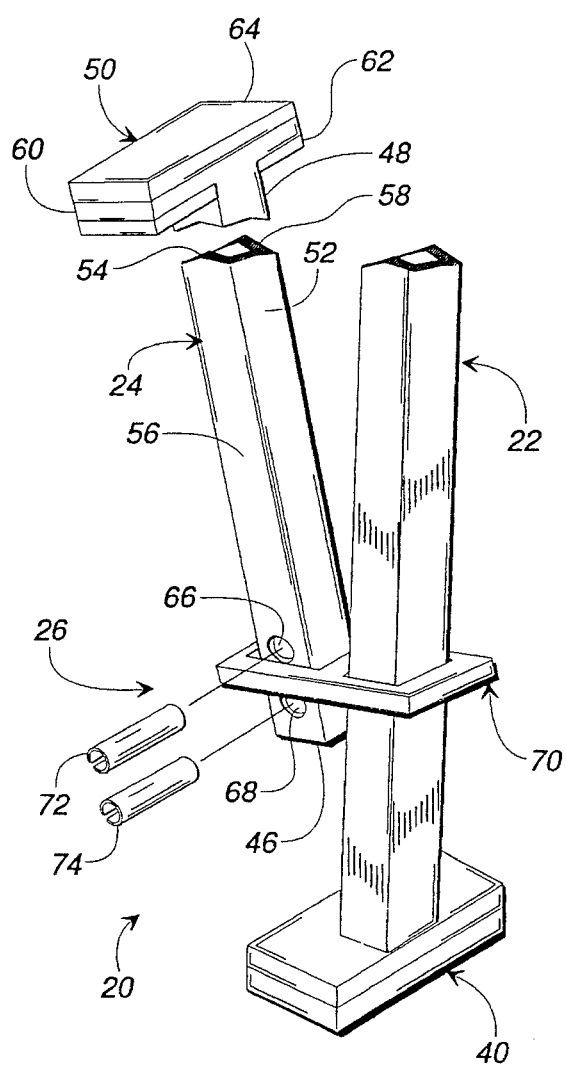
FIG. 2 is a cut-away, partially exploded, front perspective view of the multi-functional tool in the first configuration, in accordance with the preferred embodiment of the present invention.

FIG. 2 is a cut-away, partially exploded, front perspective view of the multi-functional tool 20 in accordance with the preferred embodiment of the present invention. In FIG. 2, much of the lever bar 22 and pivot bar 24 are cut away. The pivot bar 24 includes a front surface 52, an opposite rear surface 54 and opposite side surfaces 56,58, each of which extends between the ends 46,48. The pivot foot 50 includes a plate 60 that is connected and perpendicular to the free end 48. As oriented in FIG. 2, the plate 60 has a forward edge that is generally even with the front surface 52, a rear edge (not seen) that extends beyond the rear surface 54, a side edge that extends beyond the side surface 56, and a side edge (not seen) that extends beyond the side surface 58. As oriented in FIG. 2, the bottom side of the plate 60 is covered with a pad 62 and the top side of the plate 60 is covered with a pad 64, whereby the pads 62,64 generally sandwich the plate 60. The pivot bar 24 defines two bores 66,68 therethrough. Each of the bores 66,68 extends between and is accessible at the side surfaces 56,58. The attachment assembly 26 includes an attachment plate 70 (or collar) and a pair of pins 72,74 that are rigidly disposed within the bores 66,68, respectively. The pins 72,74 are shown exploded from the bores 66,68 in FIG. 2. Each pin 72,74 protrudes from both ends of its respective bore 66,68 to selectively engage the attachment plate 70, as will be discussed in greater detail below.

Figure 3:
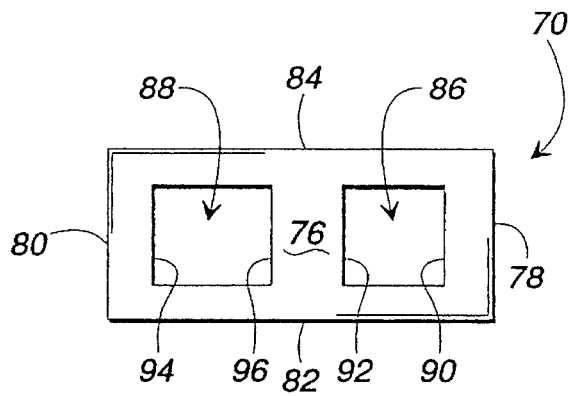
FIG. 3 is an isolated, top plan view of an attachment plate portion of the multi-functional tool in accordance with the preferred embodiment of the present invention.
Figure 4:
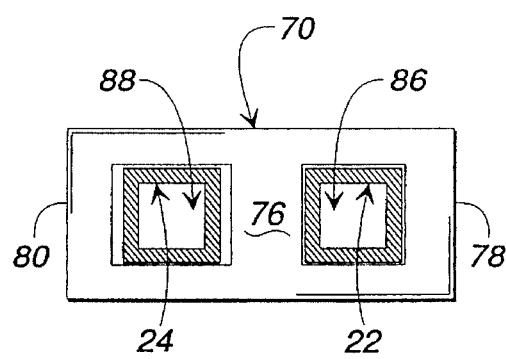
FIG. 4, is an isolated, cross-sectional view of portions of the multi-functional tool taken along line 4—4 of FIG. 1, in accordance with the preferred embodiment of the present invention.

FIG. 3 is an isolated, top plan view of the attachment plate 70, the side opposite being a mirror image, in accordance with the preferred embodiment of the present invention. The attachment plate 70 includes a top surface 76 and an opposite bottom surface (not seen), as well as a front edge 78, rear edge 80, and opposite side edges 82,84. The attachment plate 70 defines a collar hole 86 and a pivot hole 88, each of which extends through the attachment plate 70. The lever bar 22 (FIGS. 1, 2 and 4) extends through the collar hole 86 and the pivot bar 24 (FIGS. 1, 2 and 4) extends through the pivot hole 88. The attachment plate 70 further includes oppositely oriented binding edges 90,92 which are forward and rearward, respectively, of the collar hole 86. The attachment plate 70 additionally includes oppositely oriented engaging edges 94,96 which are rearward and forward, respectively, of the pivot hole 88. In accordance with the preferred embodiment of the present invention, the lever bar 22, pivot bar 24, collar hole 86, and pivot hole 88 are constructed and arranged to cooperate. The collar hole 86 is generally square and the pivot hole 88 is generally rectangular with the sides thereof that are parallel to the side edges 82,84 being longer than the sides thereof that are parallel to the front edge 78 and rear edge 80. Referring additionally to FIG. 4, which is an isolated cross-sectional view taken along line 4—4 of FIG. 1, the bars 22,24 complement the shapes of the holes 86,88, respectively. Only the lever bar 22, pivot bar 24, and attachment plate 70 are shown in FIG. 4 in an effort to clarify the view. As shown in FIG. 4, the bars 22,24 are generally square in a perpendicular cross-section thereof. The perpendicular cross-section of the bars 22,24 is uniform along the entire lengths thereof. As shown in FIG. 4, the lever bar 22 substantially occupies the entire collar hole 86, whereby front to rear as well as side to side movement of the lever bar 22 with respect to the attachment plate 70 is generally restricted. The pivot bar 24 only partially occupies the pivot hole 88 such that side to side movement of the pivot bar 24 with respect to the attachment plate 70 is generally restricted, whereas the pivot bar 24 is capable of traveling, to a limited degree, front to rear with respect to the attachment plate 70.

Figure 5:
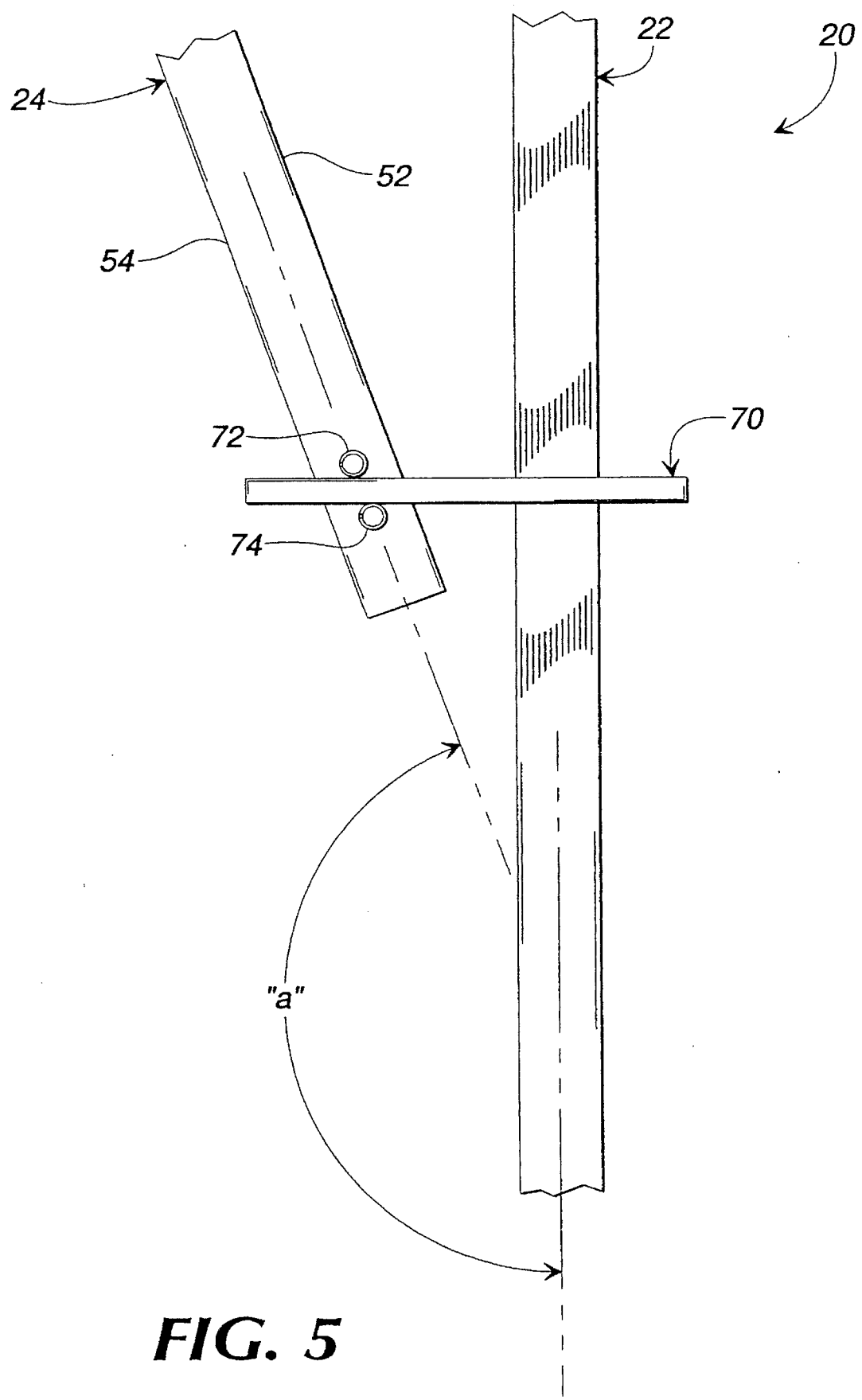
FIG. 5 is a cut-away side view of the multi-functional tool in the first configuration, in accordance with the preferred embodiment of the present invention.

In accordance with the preferred embodiment of the present invention, the multi-functional tool 20 has two preferred methods of operation. For explanatory purposes and not limitation, one of the preferred methods is referred to as a "push method" and the other preferred method is referred to as a "pull method". A discussion of the push method of operation follows immediately hereafter, and a discussion of the pull method of operation follows thereafter. In accordance with the preferred embodiment of the present invention, FIGS. 1, 2 and 5 depict the tool 20 configured for the push method of operation. FIG. 5 is a cut-away side view of the tool 20 in accordance with the preferred embodiment of the present invention. As shown in FIG. 5, when the tool 20 is configured for the push method of operation (i.e., is in the push configuration), an angle "a" is defined between the lever bar 22 and the pivot bar 24, and the angle "a" is preferably an obtuse angle. When in the push configuration, the pivot bar 24 pivots with respect to the lever bar 22 such that the angle "a" defined therebetween is capable of varying from approximately 155° to 180° when the attachment plate 70 is not cocked, or from 145° to 180° when the attachment plate is cocked (cocking will be discussed in greater detail below). Actually, in accordance with the preferred embodiment of the present invention, the bars 22,24 never actually achieve a configuration in which the angle "a" actually equals exactly 180°; rather, as 180° is approached, the bars 22,24 become parallel (see FIG. 1 ), whereby the angle "a" is no longer defined.

The pivot bar 24 is capable of pivoting forward to rearward, and vice versa, with respect to the attachment plate 70 because, referring momentarily back to FIGS. 3 and 4, the pivot hole 88 is slightly elongated. Rearward and forward pivoting of the pivot bar 24 with respect to the attachment plate 70 is limited, however, by the engaging edges 96,94 (FIG. 3 ) as they engage the front surface 52 and rear surface 54, respectively, of the pivot bar 24. Additionally, the pins 72,74 are sufficiently distant from one another to allow desirable pivoting of the pivot bar 24. In an alternate embodiment of the present invention, the pins 72,74 are also sufficiently close to one another to limit the forward to rearward pivoting of the pivot bar 24. In accordance with that alternate embodiment, when the pivot bar 24 has pivoted a certain amount, the ends of the pins 72,74 appropriately engage the attachment plate 70 to preclude further pivoting. While a certain amount of forward to rearward pivoting of the pivot bar 24 is desired, side to side pivoting of the pivot bar 24 is generally not desired and is generally precluded by a tight side to side fit of the pivot bar 24 within the pivot hole 88 (FIGS. 3 and 4), and due to the fact that the ends of the pins 72,74 extend sufficiently from the pivot bar 24 to engage the attachment plate 70 prior to the occurrence of any excessive side to side pivoting of the pivot bar 24.

Figure 6:
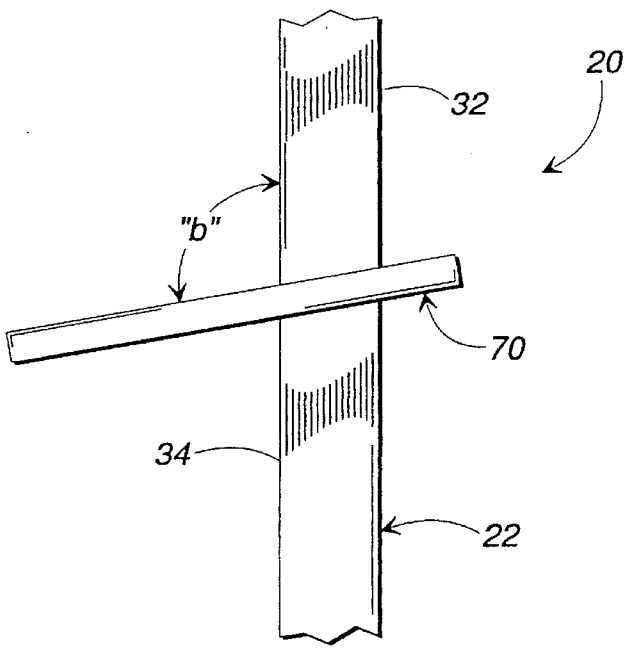
FIG. 6 is an isolate, cut-away, side view of portions of the multi-functional tool in the first configuration, in accordance with the preferred embodiment of the present invention.

As depicted in FIGS. 1 and 5, the attachment plate 70 is perpendicular to the 30 lever bar 22. As long as the attachment plate 70 is maintained perpendicular to the lever bar 22, the attachment plate 70 is capable of being easily slid along the entire length of the lever bar 22 (i.e., the attachment plate 70 is not latched to the lever bar 22), whereby the pivot bar 24 is capable of translating with respect to the lever bar 22. Referring to FIG. 6, which is an isolated, cut-away, side view of the tool 20 in which only the attachment plate 70 and lever bar 22 are depicted, when the attachment plate 70 is cocked such that it is not perpendicular to the lever bar 22 (i.e., such that an angle "b" defined between the attachment plate and the lever bar 22 is a bit greater than or a bit less than 90°), the attachment plate 70 is temporarily immobilized with respect to the lever bar 22 (i.e., the attachment plate 70 is latched to the lever bar 22). Referring momentarily back to the FIG. 2, the attachment plate 70 is also depicted therein in a cocked configuration. When in the cocked configuration, the attachment plate 70 becomes immobilized with respect to the lever bar 22 by virtue of cooperation therebetween. When the attachment plate 70 is cocked and a force is present that promotes the cocking, the binding edges 90,92 (FIG. 3 ) are forced into engagement with and frictionally engage the front surface 32 and rear surface 34, respectively, of the lever bar 22.

FIG. 7 is a perspective view of the multi-functional tool 20 in the push configuration and engaging a conventional double hung window 100, in accordance with the push method of the present invention. It should be understood that the multi-function tool 20 is readily capable of operating upon a wide variety of mechanical objects and that the double hung window 100 is simply one example of a device that the tool 20 is readily capable of expertly operating upon. Thus, the presentation of the window 100 is not intended to in any way limit the scope of the present invention. The depicted window 100 includes an upper window panel 102 and a lower window panel 104 that are housed within a peripheral window frame 106. Each window panel includes a plurality of glass panes 108, only one of which is specifically identified in an effort to clarify the view. The frame 106 includes a laterally extending lower crossmember 110, with a window sill 112 extending therefrom, and a laterally extending upper crossmember 114 parallel to and displaced above the lower crossmember 110. The frame further includes a pair of vertical upright-members 116, 118 that are distal from one another. Each of the upright-members 116, 118 extends between the crossmembers 110, 114, whereby the crossmembers 110, 114 and upright members 116, 118 cooperate to define a window opening 120 (FIG. 8). The upright-members 116, 118 define elongated vertical channels that are oriented toward the window opening 120, and the vertical edges of the window panels 102, 104 reside and travel in the channels to facilitate the opening and closing of the window 100. The lower window panel 104 includes an upper crossbar 122 and a lower crossbar 124. The upper window panel 102 also includes such crossbars, neither of which is seen in FIG. 7.

Referring to both FIGS. 1 and 7, in accordance with the push method of the present invention, the multi-functional tool 20 is capable of inventively operating to open a window 100. For example, in order to open a lower window panel 104 in accordance with the push method, a user orients the tool 20 in the push configuration with the base foot 40 upon the upper surface of the window sill 112 and the pivot foot 50 engaging the accessible underside of the upper crossbar 122, as depicted in FIG. 7. With the tool 20 configured as such and with the angle "a" (FIG. 5) at less than 180° and the attachment plate 70 immobilized with respect to the lever bar 22, the user forces the lever bar 22 toward the window 100. The tool 20 is constructed and arranged such that a maximum mechanical advantage will be achieved if the force is applied to the handle end 30 of the lever bar 22. In response to the applied force, the pivot bar 24 pivots with respect to the lever bar 22 to increase the angle "a" (FIG. 5), whereby the distance between the feet 40,50 is increased, whereby the lower window panel 104 is forced open. The moving of the feet 40,50 apart can be referred to as a stroke and the distance that the feet 40,50 move away from each other, and thus that the lower window panel 104 opens, can be referred to as a stroke distance. Minimization of the angle "a" prior to a stroke increases the stroke distance. However, increasing the angle "a" increases the mechanical advantage that is provided by the tool 20. The stroke distance is also increased by moving the plate 70 as far as possible toward the handle end 30 of the lever bar 22. During a stroke the pivot bar 24 is placed in compression, whereby the pivot bar 24 applies a force on the attachment plate 70 that functions to maintain the immobilization of the attachment plate 70 with respect to the lever bar 22. After a stroke, the tool 20 is capable of being readily prepared for an additional stroke. The tool 20 is acceptably readied, for example, by simultaneously maintaining the engagement of the feet 40,50 to their respective portion of the window 100, manually orienting the attachment plate 70 perpendicular to the lever bar 22, and translating the attachment plate 70 toward the handle end 30 while decreasing the angle "a". When the attachment plate 70 has been moved as far as possible toward the handle end 30 the attachment plate 70 is cocked, and then the tool 10 is capable of stroking again. Stroking is preferably repeated again and again until the desired result is achieved.

The foregoing presents only one acceptable example of how the tool 20 functions with respect to a window 100 in accordance with the push method of the present invention; additional examples follow. The tool 20 is capable of further opening the lower window panel 104 by orienting the tool 20 such that the base foot 40 is upon the lower crossmember 110 and the pivot foot 50 is upon the bottom of the lower crossbar 124. The tool 20 is capable of closing the lower window panel 104 by orienting the tool 20 such that the base foot 40 is upon the underside of the upper crossmember 114 and the pivot foot 50 is upon the upper accessible portion of the lower crossbar 124 or the upper portion of the upper crossbar 122. The tool 20 is capable of at least partially opening the upper window panel 102 by orienting the tool 20 such that the base foot 40 is upon the underside of the upper crossmember 114 and the pivot foot 50 is upon the upper accessible portion of the lower crossbar (not shown but see lower crossbar 124 for reference) of the upper window panel 102 or upon the upper surface of the upper crossbar (not shown but see upper crossbar 122 for reference) of the upper window panel 102. The tool 20 is capable of at least partially closing the upper window panel 102 by orienting the tool 20 such that the base foot 40 is upon the accessible underside of the upper crossbar (not shown but see upper crossbar 122 for reference) of the upper window panel 102 and the pivot foot 50 is upon the top of the upper crossbar 122.

FIG. 8 is a perspective view of the multi-functional tool 20 in a pull configuration and engaging the double hung window 100, in accordance with the pull method of the present invention. The tool is, with respect to FIG. 7, slightly enlarged in FIG. 8 in an effort to clarify FIG. 8. The tool 20 is capable of being readily converted from the push configuration (FIGS. 1, 2, and 5–7) to the pull configuration, and vice versa. Referring back to FIG. 1, to change from one configuration to the other, the attachment plate 70 is held perpendicular to the lever bar 22 and is then slid off the handle end 30 of the lever bar 22. The attachment plate 70 is then turned over and the lever bar 22 is slid back through the collar hole 86 (FIG. 3).

Referring to FIGS. 1, 2 and 8, in accordance with the pull method of the present invention, the multi-functional tool 20 is capable of operating, for example, to close a window 100. For example, in order to close a lower window panel 104 in accordance with the pull method, a user orients the tool 20 in the pull configuration with the base foot 40 engaging the accessible underside of the upper crossmember 114 and the pad 62 of the pivot foot 50 engaging the upper surface of the upper crossbar 122, as shown in FIG. 8. Once in this configuration, the attachment plate 70 is cocked to temporarily immobilize the attachment plate 70 with respect to the lever bar 22, and the handle end 30 of the lever bar 22 is pulled away from the window 100 such that the lever bar 22 pivots with respect to the upper cross member 114 while the base foot 40 remains engaged to the upper crossmember 114. This pivoting causes the pivot bar 24 to become tensioned, whereby cocking of the attachment plate 70 is promoted, and whereby the lower window panel 104 is lowered. The foregoing presents only one acceptable example of how the tool 20 functions with respect to a window 100 in accordance with the pull method of the present invention additional examples follow. The tool 20 is capable of further opening the lower window panel 104 in the pull configuration by orienting the tool 20 such that the base foot 40 is upon the lower crossmember 110 and the pad 62 of the pivot foot 50 is upon the underside of the lower crossbar 124. The tool 20 is capable of further opening the upper window panel 102 in the pull configuration by orienting the tool 20 such that the base foot 40 is upon the lower side of the upper crossmember 114 and the pad 62 of the pivot foot 50 is upon the upper side of the upper crossbar (not shown but see upper crossbar 122 for reference) of the upper window panel 102. The tool 20 is capable of partially closing the upper window panel 102 in the pull configuration by orienting the tool 20 such that the base foot 40 is upon the top of the upper crossbar 122 and the pad 62 of the pivot foot 50 is upon the accessible underside of the upper crossbar (not shown but see upper crossbar 122 for reference) of the upper window panel 102.

In accordance with the preferred embodiment of the present invention, the tool 20, with the exception of the pads 44,62,64, is acceptably constructed of metal. The pads 44,62,64 are acceptably thin strips of rubber material, or the like.

While certain of the preferred and alternate embodiments of the present invention have been disclosed herein, other embodiments of the methods and apparatus of the present invention will suggest themselves to persons skilled in the art in view of this disclosure. Therefore, it will be understood that variations and modifications can be effected within the spirit and scope of the invention and that the scope of the present invention should be limited only by the claims below. It is also understood that any relative dimensions and relationships shown on the drawings are given as the preferred relative dimensions and relationships, but the scope of the invention is not to be limited thereby.

I claim:

1. A tool for forcing a first object and a second object apart, the tool comprising:

a plate including, at least, a first side and a second side, and defining a first hole extending through said plate from said first side to said second side and a second hole extending through said plate from said first side to said second side;

an elongated first member extending through said first hole and including, at least, a first end for engaging the first object, and a second end opposite from said first end, wherein said first member and said plate are constructed and arranged to cooperate to define an unlatched configuration in which said plate is generally perpendicular to said first member, wherein in said unlatched configuration said plate is capable of sliding along said first member, and wherein first member and said plate are constructed and arranged to cooperate to define a latched configuration in which said plate is generally not perpendicular to said first member, wherein in said latched configuration said plate couples to said first member and is immobilized relative to said first member;

an elongated second member extending through said second hole and including, at least,
a first end for engaging the second object, and
a second end opposite from said first end; and a juxtaposed pair of pins connected to and extending from said second member proximate to said second end of said second member, wherein said pair of pins generally sandwich said plate, and wherein said pair of pins and said plate are constructed and arranged such that said second member is connected to said plate and such that said first end of said second member is capable of pivoting, through a limited range of motion, toward and away from said first member.

2. The tool of claim 1,
wherein said first end of said first member extends from said plate in a first direction, wherein said second end of said first member extends from said plate in a second direction that is opposite from said first direction, and wherein said first end of said second member extends from said plate generally in said first direction.

3. The tool of claim 1, wherein said first end of said first member extends from said plate in a first direction, and wherein said first end of said second member extends from said plate in a second direction to define an obtuse angle between said first member and said second member.

4. The tool of claim 1, wherein said first member is generally rectangular in a cross-section view taken perpendicular to said first member, and wherein said first hole is generally rectangular in a plan view of said first side of said of plate.

5. The tool of claim 1, wherein said plate further includes, at least,
 a first end, wherein said first hole is proximate to said first end,
 a second end opposite from said first end, wherein said second hole is proximate to said second end,
 a first edge extending between said first end and said second end, and
 a second edge opposite from said first edge and extending between said first end and said second end, wherein said pair of pins includes, at least,
 a first pin connected to and extending from said second member, wherein said first pin includes, at least,
  a first end extending from said second member toward said first edge of said plate, and
  a second end extending from said second member toward said second edge of said plate, and
 a second pin connected to and extending from said second member, wherein said second pin includes, at least,
  a first end extending from said second member toward said first edge of said plate, and
  a second end extending from said second member toward said second edge of said plate.

6. The tool of claim 5, wherein said first end of said first member extends from said plate in a first direction, wherein said second end of said first member extends from said plate in a second direction that is opposite from said first direction, and wherein said first end of said second member extends from said plate generally in said first direction.

7. The tool of claim 6 further comprising:

a first engaging plate connected to said first end of said first member, wherein said first engaging plate is perpendicular to said first member; and a second engaging plate connected to said first end of said second member, wherein said second engaging plate is perpendicular to said second member.

8. The tool of claim 5, wherein said first end of said first member extends from said plate in a first direction, and wherein said first end of said second member extends from said plate in a second direction to define an obtuse angle between said first member and said second member.

9. The tool of claim 8 further comprising:

a first engaging plate connected to said first end of said first member, wherein said first engaging plate is perpendicular to said first member; and a second engaging plate connected to said first end of said second member, wherein said second engaging plate is perpendicular to said second member.

10. A tool for forcing a first object and a second object apart, the tool comprising:

an elongated first member; including, at least,
 a first end for engaging the first object,
 a second end opposite from said first end, and
 a plurality of mounting positions disposed between said first end and said second end of said first member;

a coupler means for releasably coupling to each mounting position of said plurality of mounting positions,
 wherein when said coupler means is coupled to a mounting position of said plurality of mounting positions, said coupler means is immobilized relative to said first member,
 wherein said first end of said first member extends from said coupler means in a first direction,
 wherein said coupler means includes, at least, a plate defining a passage extending through and perpendicular to said plate,
 wherein said first member extends through said passage,
 wherein said plate and said first member are constructed and arranged to cooperate to define an unlatched configuration in which said plate is generally perpendicular to said first member, wherein in said unlatched configuration said plate is capable of sliding along said first member, and
 wherein said plate and said first member are constructed and arranged to cooperate to define a latched configuration in which said plate is not perpendicular to said first member, wherein in said latched configuration said plate couples to said first member and is immobilized relative to said first member; and an elongated second member including, at least,
 a first end for engaging the second object, and
 a second end opposite from said first end, wherein said second member is pivotally connected to said coupler means proximate to said second end of said second member, and wherein said first end of said second member extends from said coupler means in a second direction to define an obtuse angle between said first member and said second member.

11. The tool of claim 10, wherein said plurality of mounting positions includes, at least, a continuum of mounting positions.

12. A tool for forcing a first object and a second object apart, the tool comprising:

an elongated first member; including, at least,
 a first end for engaging the first object,
 a second end opposite from said first end, and
 a plurality of mounting positions disposed between said first end and said second end of said first member;

a coupler means for releasably coupling to each mounting position of said plurality of mounting positions,
 wherein when said coupler means is coupled to a mounting position of said plurality of mounting positions, said coupler means is immobilized relative to said first member,
 wherein said first end of said first member extends from said coupler means in a first direction,
 wherein said coupler means includes, at least, a collar at least partially encircling said first member, wherein said collar and said first member are constructed and arranged to cooperate to define an unlatched configuration in which said collar is capable of being moved relative to said first member, and wherein said collar and said first member are constructed and arranged to cooperate to define a latched configuration in which said collar couples to a mounting position of said plurality of mounting positions and is immobilized relative to said first member; and an elongated second member including, at least, a first end for engaging the second object, and a second end opposite from said first end, wherein said second member is pivotally connected to said coupler means proximate to said second end of said second member, and wherein said first end of said second member extends from said coupler means in a second direction to define an obtuse angle between said first member and said second member.

13. The tool of claim 12, wherein said plurality of mounting positions includes, at least, a continuum of mounting positions.

* * * * *